US011861425B2

(12) United States Patent
Antinori et al.

(10) Patent No.: US 11,861,425 B2
(45) Date of Patent: Jan. 2, 2024

(54) RUNTIME MAPPING OF ASYNCHRONOUS APPLICATION PROGRAMMING INTERFACE MESSAGING TOPICS AND SCHEMAS

(71) Applicant: Red Hat, Inc., Raleigh, NC (US)

(72) Inventors: Paolo Antinori, Milan (IT); Eric Philip Wittmann, Hartford, CT (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/324,885

(22) Filed: May 19, 2021

(65) Prior Publication Data
US 2022/0374296 A1  Nov. 24, 2022

(51) Int. Cl.
*G06F 9/54* (2006.01)
*G06F 16/383* (2019.01)

(52) U.S. Cl.
CPC .............. *G06F 9/546* (2013.01); *G06F 9/541* (2013.01); *G06F 9/547* (2013.01); *G06F 16/383* (2019.01)

(58) Field of Classification Search
None
See application file for complete search history.

(56) References Cited

U.S. PATENT DOCUMENTS

| | | | |
|---|---|---|---|
| 8,402,081 B2 * | 3/2013 | Sandoval | G06F 16/9535 709/201 |
| 10,289,383 B2 | 5/2019 | Lukkoor et al. | |
| 10,681,164 B2 * | 6/2020 | Ruiz-Meraz | G06F 9/541 |
| 2005/0050549 A1 * | 3/2005 | Joseph | G06F 9/547 719/313 |
| 2005/0138632 A1 * | 6/2005 | Groetzner | G06F 9/546 719/313 |
| 2006/0031232 A1 * | 2/2006 | Jahn | G06Q 10/10 |
| 2017/0097949 A1 * | 4/2017 | Kline | G06F 16/24575 |
| 2018/0102938 A1 * | 4/2018 | Yoon | G06F 11/323 |
| 2021/0167794 A1 * | 6/2021 | Richart | H04Q 9/00 |
| 2021/0385251 A1 * | 12/2021 | Crabtree | H04L 63/1425 |

(Continued)

FOREIGN PATENT DOCUMENTS

CN          112182036 A         1/2021

OTHER PUBLICATIONS

Kreps et al.; Kafka: A Distributed Messaging System for Log Processing; Jun. 12, 2011; 7 pgs; LinkedIn Corp.

(Continued)

*Primary Examiner* — Chat C Do
*Assistant Examiner* — William C Wood
(74) *Attorney, Agent, or Firm* — K&L Gates LLP

(57) ABSTRACT

Systems and methods for generating asynchronous application programming interface (API) documents are generally described. In various examples, a topic discovery request may be sent to a message broker. A list of topics may be received from the message broker. First identifier data identifying a first topic of the list of topics may be received from the message broker. A first message may be received from the message broker, where the first message pertains to the first topic. First schema may be determined using the first message. The first schema data may describe content of the first message and organization of the content of the first message. The first identifier data may be stored in a first data structure in association with the first schema data.

19 Claims, 5 Drawing Sheets

(56) References Cited

U.S. PATENT DOCUMENTS

2022/0014594 A1* 1/2022 Mladin ............... H04W 4/70

OTHER PUBLICATIONS

Azar; Kafka, Avro Serialization, and the Schema Registry; Sep. 15, 2017; 19 pages; Dzone.
Author unknown; Use Case 1: Registering and Querying a Schema for a KafkaTopic; 2019; 1 pg; Cloudera, Inc.
Difelice; A Brief Introduction to Schema Evolution in Kafka Schema Registry; Nov. 5, 2020; 8 pgs.
Author unknown; Manage Schemas for Topics; 2021; 27 pages; Confluent, Inc.

* cited by examiner

RUNTIME MAPPING OF ASYNCHRONOUS APPLICATION PROGRAMMING INTERFACE MESSAGING TOPICS AND SCHEMAS

BACKGROUND

The present disclosure generally relates to asynchronous application programming interface (API) specifications. Representational State Transfer (REST) APIs use the synchronous paradigm of communication, where a request is made and a response is waited for before making a new request. For example, in the context of the Internet, a uniform resource locator (URL) is entered into a browser interface, which sends a request to the server. The server sends the response with the content of the website. Accordingly, the web is an example implementation of a REST API. REST API calls are often referred to as "synchronous" API calls indicating that code execution and user interaction is stopped until the call returns the requested information. In some other scenarios other operations may be asynchronous, as code execution and/or user interaction need not stop to wait for the response. Event-driven architectures (EDAs) employ asynchronous communication. In EDAs, data (usually referred to as messages) are sent by a "publisher" (an entity generating the data) to a message broker. The message broker may be infrastructure that stores the message and delivers the message to "subscribers" (applications that have registered to receive the particular message from the particular publisher).

SUMMARY

The present disclosure provides a new and innovative system, methods and apparatus for mapping of asynchronous API messaging topics and schemas. In an example, a topic discovery request may be sent to a message broker. A list of topics may be received from the message broker. First identifier data identifying a first topic of the list of topics may be determined. A first message may be received from the message broker. In various examples, the first message may pertain to the first topic. In some cases, first schema data may be determined using the first message. In some examples, the first schema data may describe content of the first message and organization of the content of the first message. In various examples, the first identifier data may be stored in association with the first schema data in a first data structure.

In another example, a system may comprise a message broker and a first computing device. The first computing device may comprise non-transitory computer-readable memory configured in communication with at least one processor. The non-transitory computer-readable memory may store instructions that, when executed by the at least one processor, are configured to send a topic discovery request to a message broker. In various examples, the instructions may be further configured to receive a list of topics from the message broker. In some further examples, the instructions may be further configured to determine first identifier data identifying a first topic of the list of topics. In some examples, the instructions may be further configured to receive a first message from the message broker. In various examples, the first message may pertain to the first topic. In some cases, the instructions may be further configured to determine first schema data using the first message. In some examples, the first schema data may describe content of the first message and organization of the content of the first message. In various examples, the instructions may be further configured to store the first identifier data in association with the first schema data in a first data structure.

In yet another example, a non-transitory machine-readable medium storing a program is generally described. In various examples, when the program is executed by a processor, the program may be configured to send a topic discovery request to a message broker. In various cases, the program may be further configured to receive, from the message broker, a list of topics of the message broker. In some examples, the program may be further configured to receive, from the message broker, first identifier data identifying a first topic of the list of topics. In various cases, the program may be further configured to receive a first message from the message broker. In some examples, the first message may pertain to the first topic. In some examples, the program may be further configured to determine first schema data using the first message. In various other examples, the first schema data may describe content of the first message and organization of the content of the first message. In various examples, the program may be further configured to store the first identifier data in association with the first schema data in a first data structure.

Additional features and advantages of the disclosed method and apparatus are described in, and will be apparent from, the following Detailed Description and the Figures.

DETAILED DESCRIPTION OF EXAMPLE EMBODIMENTS

Figure 1:
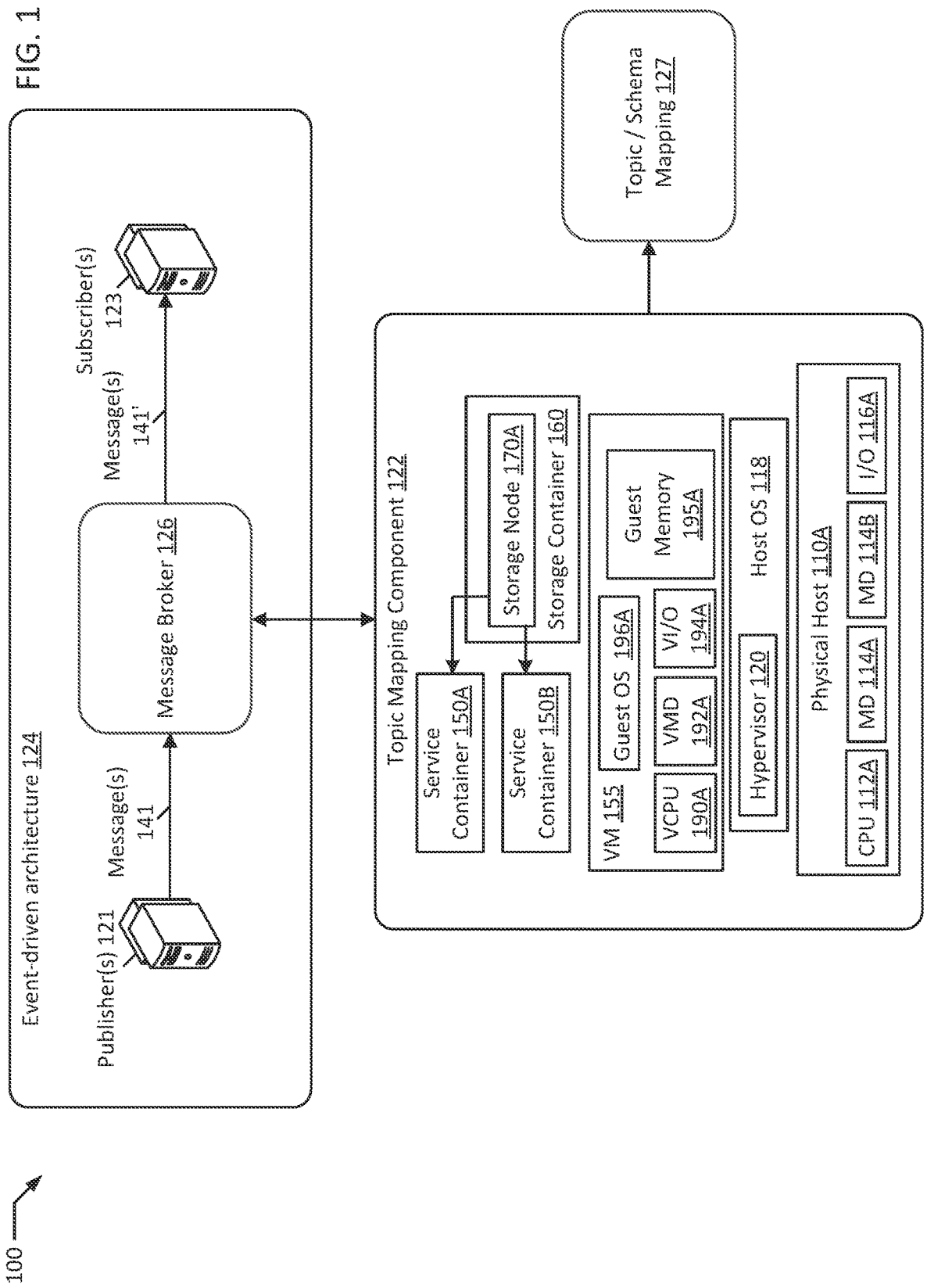
FIG. 1 is a block diagram of a topic mapping device configured in communication with an event-driven architecture, according to various examples of the present disclosure.

Event-driven architectures (EDAs) employ asynchronous communication. In EDAs, entities generating data are referred to as "publishers," while the recipients/consumers of such data are referred to as "subscribers." Communication in EDAs is referred to as asynchronous because a publisher need not wait for a response from any subscribers prior to generating/publishing additional data. By contrast, in a synchronous messaging architecture such as those provided by REST APIs, a sender waits for a response from a recipient prior to sending additional data.

EDAs typically employ infrastructure called a "message broker" that receives messages (data) from publishers and delivers the messages to subscribers that have registered to receive such messages. Examples of message brokers include RabbitMQ, Apache Kafka, JBoss Messaging, Solace, etc. Accordingly, publishers may be data generating software/hardware that sends messages to the message broker. For example, a publisher may be a smart thermostat that sends temperature data to a message broker, a social media network that sends new subscriber data to a message broker, a smart refrigerator that sends data regarding food stored in the refrigerator to a message broker, etc. Publishers may be any type of application and/or embedded systems that generate and send data using an EDA. Subscribers may be applications that connect to the message broker, manifest an interest in a certain type of message (e.g., messages assigned to a particular "topic"), and maintains the connection with the message broker so that the message broker is able to push the messages to the subscriber.

Messages are data that are sent by publishers to the message broker, and which are pushed to the relevant subscribers. The content of messages can be any data. Such messages are often described as events or commands. Events communicate a fact (e.g., a temperature detected by the thermostat), while commands provide executable instructions to cause the subscriber application to take a particular action.

Message brokers support communication through a number of different channels, referred to herein as "topics." A topic may include a name, a version number, metadata describing the topic, etc. Publishers send messages that are organized into particular topics. Subscribers are able to subscribe to topics of interest in order to receive messages that are of interest to the subscriber while excluding messages of other topics which may not be of interest to the subscriber. Accordingly, subscribers may subscribe to a particular topic with the message broker. Additionally, publishers may publish message data that is organized into a topic. Upon receipt of such message data, the message broker may determine the topic, may determine the subscribers that are subscribed to the topic, and may send the message data to those subscribers.

In EDAs, messages may be sent from publishers using a variety of different protocols. Examples of such protocols may include, but are not limited to, message queuing telemetry transport (MQTT), constrained application protocol (CoAP), advanced message queuing protocol (AMQP), hypertext transfer protocol (HTTP), etc. Accordingly, asynchronous application programming interfaces (APIs) (e.g., AsyncAPI) may be similar to synchronous APIs (e.g., OpenAPI), but may include different content/organization. For example, asynchronous APIs may include metadata indicating the protocol being used, metadata indicating one or more topic names, server data, schema data (describing a content and/or organization of the message data), etc.

Schema data for a particular topic and/or message of an EDA can be used to develop applications and/or systems that can ingest and use data received from the particular message type with which the schema is associated. For example, schema data may be used to programmatically populate fields of an ingesting application and/or to label and/or use portions of the data received as part of the message.

However, EDA topics are byte-oriented and do not keep track of the type of data that is written. Knowing the type of data being written on specific topics is needed by consumers of the topics to correctly interpret the information. However, such information is not provided by the EDA architecture (or by the message broker) and is typically tracked externally by the consumers (e.g., subscribers).

Described herein are systems and techniques that may be used to automatically generate mappings between EDA topics and schemas that define the content and/or organization of data included in the messages of the topics. In various examples, a topic mapping component may query the message broker of an EDA for each topic handled by the message broker. Then, for each topic handled by the message broker, the topic mapping component may subscribe to the topic and may sample messages from each topic. The content of the messages may be parsed to identify schema data. The schema data may be identified in the header of the message (e.g., by reference to an external schema registry or other remote location) and/or the schema data may be present in the message payload. The topic mapping component may generate a database (or other data structure) that associates each topic (e.g., using a unique topic identifier) with the schema data defining the content and/or organization of messages for that topic. In some examples, there may be multiple message types being sent on a particular topic—each with its own respective schema. In such cases, the topic mapping component may map the topic identifier to multiple message-type identifiers, and may further map each message-type identifier to the appropriate schema. The mapping database may be updated over time to ensure that the relevant schema data is maintained for the topic/message.

The logical mapping database may then be used by external client devices (such as user-facing software) to expose to the users a list of Kafka topics to write to and/or read from, together with the details of the schema data that such topics are using. In various examples, such topic/schema mappings may be generated for each message broker of an EDA.

FIG. 1 is a block diagram of a system 100 comprising a topic mapping component 122 configured in communication with an event-driven architecture 124, according to various examples of the present disclosure. The topic mapping component 122 may be implemented using software, hardware, and/or some combination thereof. In the example topic mapping component 122 depicted in FIG. 1, the topic mapping component 122 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Topic mapping component 122 may run one or more VMs (e.g., VMs 155), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage controller 142 may additionally manage storage in dedicated storage nodes (e.g., NAS, SAN, etc.). In an example, storage controller 142 may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to orchestrator 140. In the example, storage controller 142 may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

The various virtualized computing systems (e.g., service containers 150A, 150B, VM 155) may be examples of computing environments that may deploy one or more of the techniques described herein for programmatic generation of a topic/schema mapping 127. For example, service container 150A may request and/or receive a list of topics handled by message broker 126. Service container 150B may sample messages from each topic of the list of topics and/or may determine schema data for the different topics. VM 155 may receive the list of topics (e.g., topic identifier data) from service container 150A and the schema data from service container 150B and may populate the topic/schema mapping 127 in a database or other data structure. The foregoing example is merely one possible implementation of a topic mapping component 122. The actual deployment of the various services and/or systems of the topic mapping component 122 are implementation-specific details and may be modified as desired in accordance with the present disclosure. The topic mapping component 122 may be deployed across any number of physical computing devices and/or virtualized computing environments, depending on the desired implementation.

Event-driven architecture 124 may comprise one or more publisher(s) 121. Publisher(s) 121 may generate message(s) 141 that may be sent to message broker 126. Although only a single message broker 126 is depicted in FIG. 1, multiple message brokers may be used in a given EDA. The techniques for topic/schema mapping are equally applicable to an EDA having multiple message brokers. Indeed, in such examples, a separate topic/schema mapping 127 may optionally be created for each message broker 126. Message broker 126 (e.g., Apache Kafka) may receive the message(s) 141 and may determine the topics to which the message(s) 141 pertain. For each message 141, message broker 126 may determine the set of subscriber(s) 123 that have subscribed to the topic of the particular message and may send the message 141' to the appropriate subscribers 123. As shown in FIG. 1, topic mapping component 122 may communicate with message broker 126 to receive a list of topics being handled by the message broker 126 and may subscribe to and parse messages from each topic to determine the schema data that is associated with each topic (and with each distinct message type of each topic, if there are more than one).

As an example, the topic mapping component 122 may request a list of topics handled by the message broker 126. Additionally, the topic mapping component 122 may sample messages from the various topics in order to determine schema data of the messages (e.g., data indicating the content and/or organization of the messages). Below is an example of a topic with a message called "lightMeasured":

```
39   topics:
40     smartylighting/streetlights/1/0/event/{streetlightId}/lighting/measured:
41       description: The topic on which measured values may be produced and
         consumed.
42       parameters:
43         streetlightId:
44           $ref: '#/components/parameters/streetlightId'
45       subscribe:
46         summary: Receive information about environmental lighting
         conditions of a particular streetlight.
47         operationId: receiveLightMeasurement
48         traits:
49           - $ref: '#/components/operationTraits/kafka'
50         message:
51           $ref: '#/components/messages/lightMeasured'
```

For the topic described on line 40, a particular schema may describe the format of data for the messages "lightMeasured." $ref on line 51 is a reference to a different line of the text describing an internal schema of lightMeasured messages (e.g., in the payload of such messages). An example of such a schema may be:

```
87   messages:
88     lightMeasured:
89       name: lightMeasured
90       title: Light measured
91       summary: Inform about environmental lighting conditions
         for a particular streetlight.
92       contentType: application/json
93       traits:
94         - $ref: '#/components/messageTraits/commonHeaders'
95       payload:
96         $ref: "#/components/schemas/lightMeasuredPayload"
```

The topic mapping component 122 includes logic to parse such schema data included in messages. The topic mapping component 122 may store the schema data in association with the relevant topic ID/message ID in the topic/schema mapping 127, as described in further detail below. The example schema above, in turn, includes references on lines 94 and 96 to different information about the message schema for "lightMeasured" messages. For example, a pointer to the payload schema for such messages in included in line 96. An example of the payload schema may be internal to the message or may be provided at an external location that is pointed to by the $ref at line 96. An example of such a payload schema may be:

```
114   schemas:
115     lightMeasuredPayload:
116       type: object
117       properties:
118         lumens:
119           type: integer
120           minimum: 0
```

```
121           description: Light intensity measured in lumens.
122         sentAt:
123           $ref: "#/components/schemas/sentAt"
```

Accordingly, topic mapping component 122 may parse messages sampled from message broker 126 for each topic of interest in order to determine schema data describing the content and/or organization of the sampled messages. In some examples, the schema data may be included within the messages themselves. Such schema data may be referred to as internal schema data. In some other examples, the schema data may be referenced in the messages, but may not be present within the message payloads. For example, a message may include a pointer and/or URL to a different location at which the schema data is accessible. Such schema data may be referred to as external schema data. In some further examples, the logic of the topic mapping component 122 may be configured to determine the schema data based on the organization of the content of the sampled message, even where no internal or external schema data is provided explicitly.

Once populated, a user or other system may query topic/schema mapping 127 using a message ID or topic ID (e.g., identifier data identifying a message received from message broker 126 or a subscribed-to topic handled by message broker 126). The message ID or topic ID may be used to retrieve the schema data that can be used to interpret the message payload.

Figure 2:
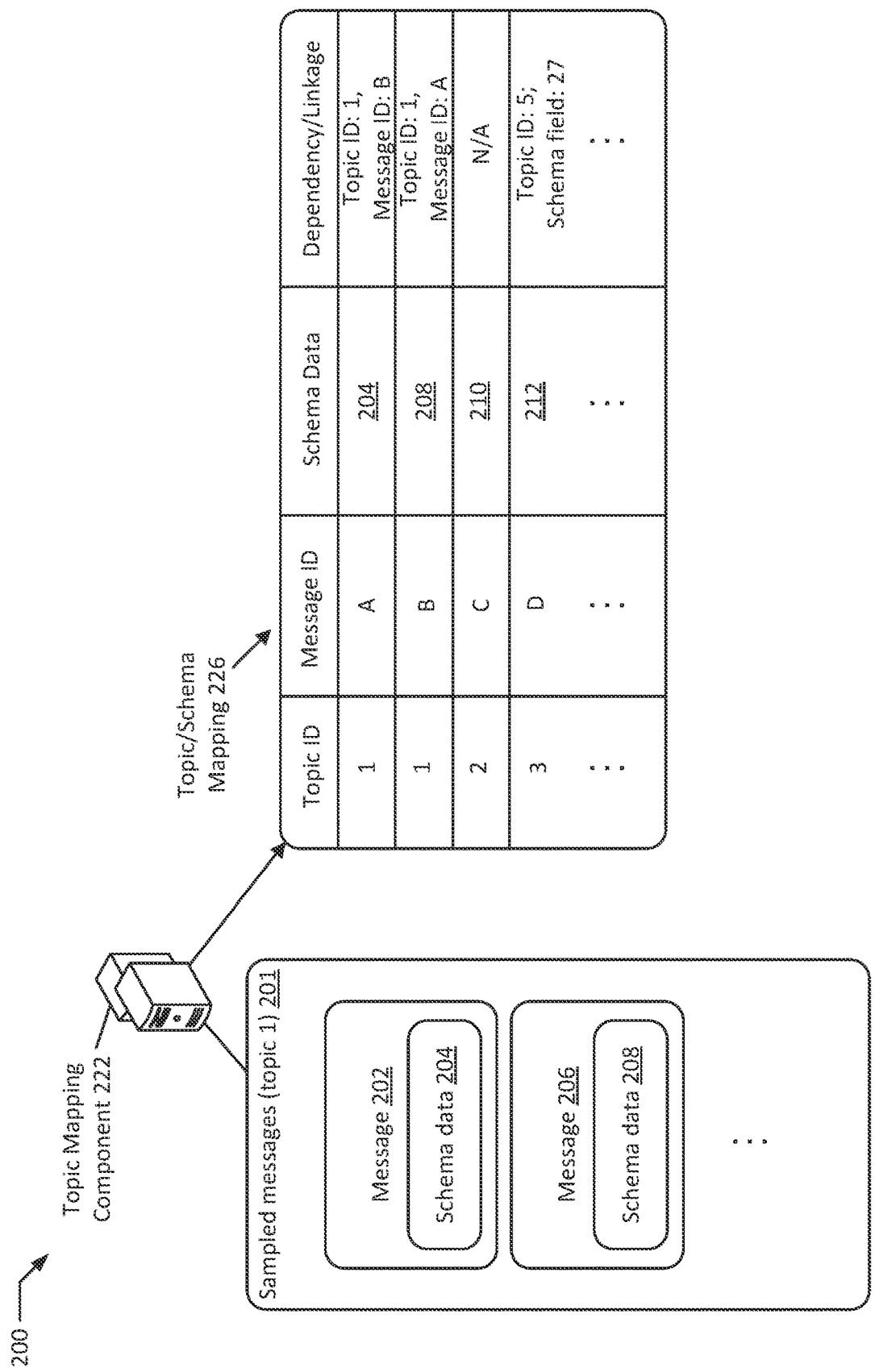
FIG. 2 is a block diagram of a topic mapping device generating a topic/schema mapping using sampled messages, according to an example of the present disclosure.

FIG. 2 is a block diagram of a system 200 illustrating a topic mapping component 222 generating a topic/schema mapping 226 using sampled messages, according to an example of the present disclosure. As depicted in FIG. 2, after requesting and receiving a list of topics handled by a particular message broker, topic mapping component 222 may subscribe to and sample messages for each topic.

For example, topic mapping component 222 may receive sampled messages 201 for topic 1. Sampled messages 201 may comprise message 202, message 206, etc. Topic mapping component 222 may determine schema data associated with each topic. For example, for topic 1, topic mapping component may determine schema data 204 from message 202 and schema data 208 from message 206. If message 202 and message 206 are of the same type of message for topic 1, schema data 204 and schema data 208 may be the same. However, in various other examples, a topic may include different message types that are each associated with their own respective schemas. Accordingly, in some cases, schema data 204 and schema data 208 may be different.

As previously described, external references to schema data may be found in the message headers. However, in other cases, the schema data (e.g., the schema definition) may be found in a message's payload. In further examples, an external reference to the schema definition (and/or a portion of the schema definition) may be found in either the message header or the message payload.

Topic mapping component 222 may generate topic/schema mapping 226. Topic/schema mapping 226 may include topic identifier data (e.g., a Topic ID). In various examples, the topic identifier data may be metadata included in the header of messages for that topic. In other examples, the topic identifier data may be assigned by the message broker and/or by the topic mapping component 222. Further, in some examples, the topic/schema mapping 226 may comprise message identifier data (e.g., a Message ID). The message identifier data may be useful when a particular topic includes more than one message type.

In the example depicted in FIG. 2, Topic 1 (identified by Topic ID 1) comprises two message types identified by Message identifier data A and B. Each of these message types for Topic 1 is associated with its own schema data. For example, Message ID A is associated with schema data 204, while Message ID B is associated with schema data 208. In the example depicted in FIG. 2, Topic ID 2 has only a single message type (Message ID C) and is associated with schema data 210. Similarly, Topic ID 3 has only a single message type (Message ID D) and is associated with schema data 212.

In various examples, topic/schema mapping 226 may optionally store dependency/linkage information for the various topics. Dependency/linkage information may define dependencies for the particular Topic ID, Message ID, and/or Schema. For example, Message ID A of Topic ID 1 and Message ID B of Topic ID 1 may be linked. For example, some data of Message ID A may depend on and/or refer to some data of Message ID B. Accordingly, the dependency/linkage information notes the dependency for each of these Message IDs. In another example, Topic ID 3, Message ID D notes a linkage to Topic ID 5, Schema field 27. This may indicate that data of Topic ID 3, Message ID D is linked to the specified field of another topic (i.e., Topic ID 5). For example, some portion of the data of Topic ID 3 may be used to populate a schema field of a different topic, etc.

After topic/schema mapping 226 is generated, other computing devices and/or components may use topic/schema mapping 226 to determine schema data for EDA messages handled by the message broker for which the topic/schema mapping 226 was generated. For example, a subscriber device may query the topic/schema mapping 226 using a Topic ID and/or Message ID. The subscriber device may determine the Topic ID and/or Message ID from a header of a received message. The subscriber device may query the topic/schema mapping 226 to determine the pertinent schema data and/or dependency/linkage information associated with the message. The schema data and/or dependency/linkage information may be used in a variety of ways. For example, schema data may be used to develop an application that automatically ingests message data and/or to label and/or use portions of the data received as part of the message.

Figure 3:
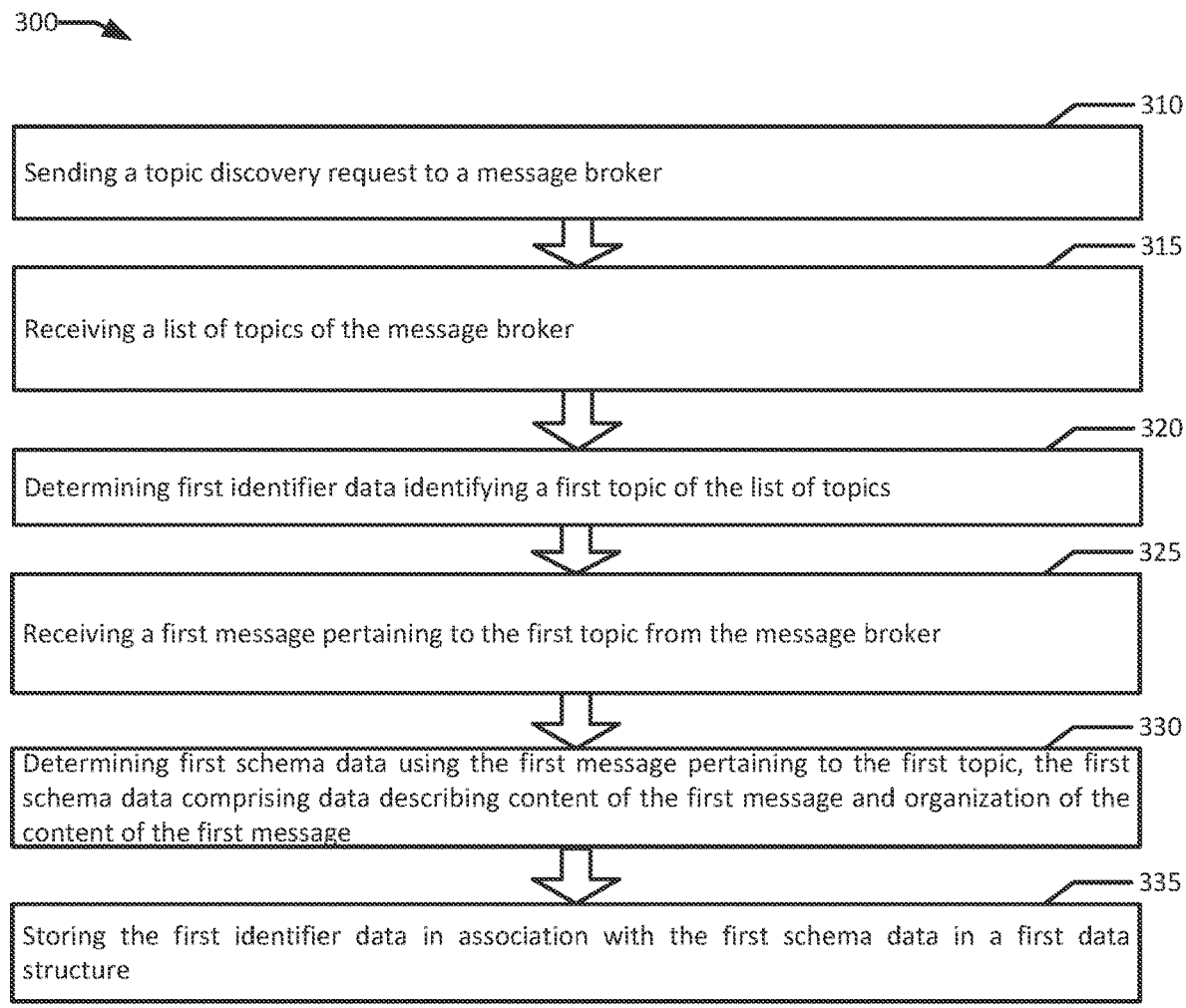
FIG. 3 is flowchart illustrating an example process for generating mappings between topics and message schemas for an event-driven architecture, according to an example of the present disclosure.

FIG. 3 is flowchart illustrating an example process for generating mappings between topics and message schemas for an event-driven architecture, according to an example of the present disclosure.

Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes sending a topic discovery request to a message broker (block 310). In various examples, topic mapping component 122 may send a topic discovery request to message broker 126. In the example of FIG. 3, the topic discovery request may request information concerning topics registered with message broker 126. For example, the topic discovery request may request a list of all topics (e.g., all topic IDs) handled by message broker 126 or a subset of topics handled by message broker 126.

In an example, the process 300 may include receiving a list of topics of the message broker (block 315). In various examples, the message broker 126 may return a list of names (and/or identifiers) of topics in response to the topic discovery request. In some examples, after receiving the list of names of the topics, the topic mapping component 122 may subscribe to the different topics in order to be able to sample messages from each of the topics to generate a topic/schema mapping (e.g., topic/schema mapping 226). In some examples, the topic mapping component 122 may send metadata discovery requests for metadata related to each topic of interest. The metadata may be used to populate various fields of a topic/schema mapping. For example, security configuration parameters, server information, protocol information, version numbers, etc., may be returned describing each topic.

In an example, the process 300 may include determining first identifier data identifying a first topic of the list of topics (block 320). In some examples, the first identifier data may identify and/or distinguish the first topic from among other topics handled by message broker 126. The first identifier data may be used to populate a field of the topic/schema mapping 226 that identifies the particular topic from among other topics handled by the message broker 126.

In an example, the process 300 may include receiving a first message pertaining to the first topic from the message broker (block 325). For example, the topic mapping component 122 may subscribe to the first topic and may sample messages generated for the first topic and received from the message broker 126. As described in further detail below, logic of the topic mapping component 122 may be configured to determine various payload data and/or metadata included in the sampled messages and may include such data in the topic/schema mapping.

In an example, the process 300 may include determining first schema data using the first message pertaining to the first topic, where the first schema data may include data describing content of the first message and/or organization of the first message (block 330). For example, a message may include internal schema data that describes formatting of the messages. Accordingly, the internal schema data may be used by topic mapping component 122 to populate a field of the topic/schema mapping (e.g., topic/schema mapping 226) for the first message of the first topic. Such a procedure may be followed for each topic of interest and/or for each message type of each topic in order to programmatically generate a topic/schema mapping 226 for the message broker 126 of the EDA. The internal schema may describe the formatting of the message (e.g., the schema may describe the different fields and their location within the payload of the message) and/or may describe the content of the message (e.g., the schema may describe what kind of data is represented in each field of the payload of the message. Additionally, the schema may similarly describe the content and organization of the message header. Further, although an internal schema is described herein, the first schema may instead be an external schema that is referenced by data within the first message. The external schema may be stored at a different location (rather than within the payload of the first message). Accordingly, the topic mapping component 122 may access the location referenced by the first message data in order to determine the first schema data for the first message. In still other examples, logic of the topic mapping component 122 may be used to parse the first message in order to determine the schema (e.g., based on a comparison of the first message to one or more known schemas).

In an example, the process 300 may include storing the first identifier data in association with the first schema data in a first data structure (block 335). As described herein, the topic mapping component 122 may generate the topic/schema mapping 226 which may be instantiated as a data structure. The topic/schema mapping 226 may associate topic identifier data and/or message type identifier data with the appropriate schema data for that topic and/or message type. Accordingly, the topic mapping component 122 may programmatically populate the fields of the topic/schema mapping 226 for each topic and/or each message type discovered during the process 300 in order to build a machine-readable and/or searchable topic/schema mapping 226. As previously described, users may then search for the appropriate schema data for a particular topic and/or message type and may use the schema data to automatically interface with the event-driven architecture 124 with other systems and/or generate code for the event-driven architecture 124.

Figure 4:
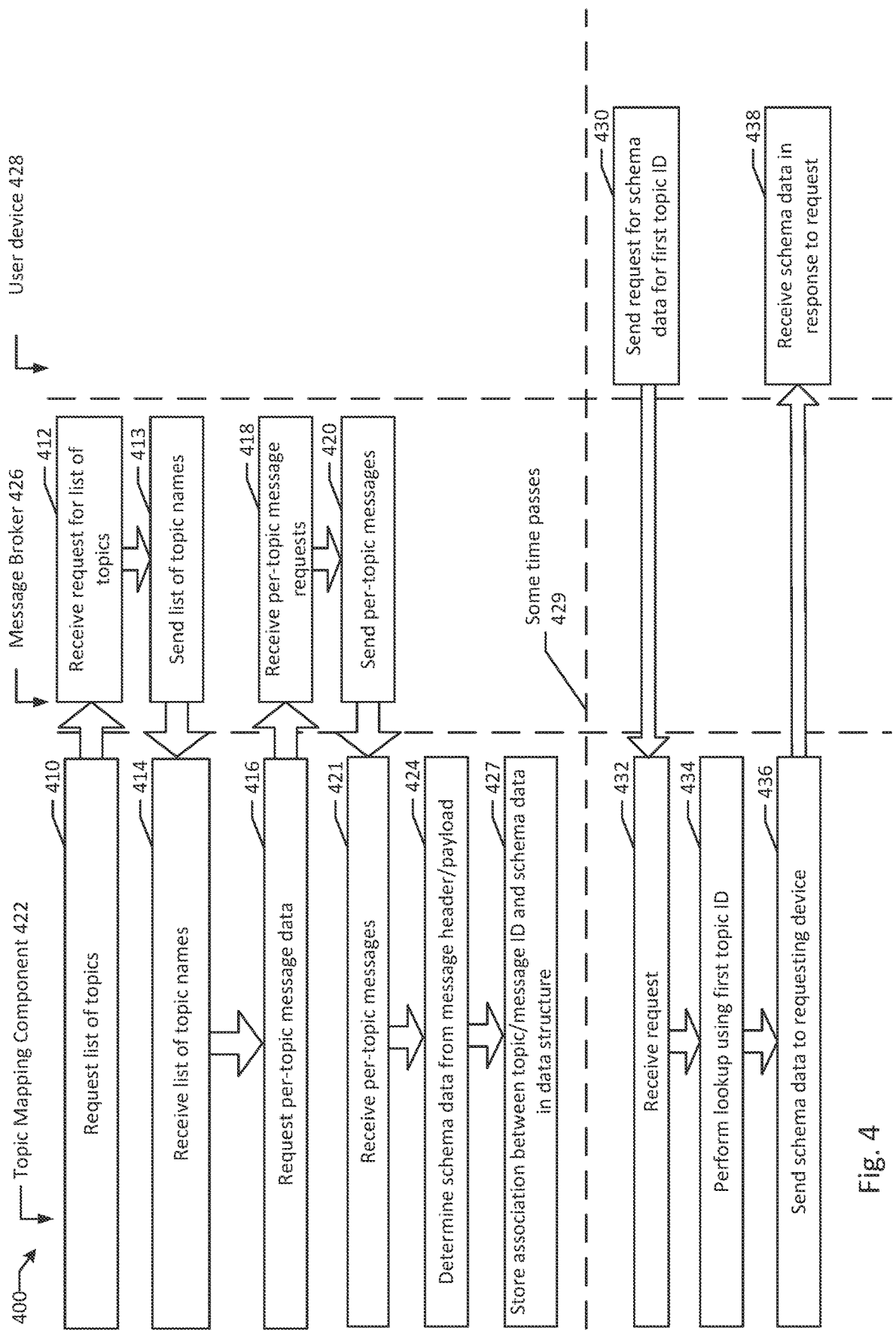
FIG. 4 illustrates a flow diagram of an example generation of mappings between topics and message schemas for an event-driven architecture according to various aspects of the present disclosure.

FIG. 4 illustrates a flow diagram of an example generation of mappings between topics and schema data for an event-driven architecture according to various aspects of the present disclosure. Although the examples below are described with reference to the flow diagram illustrated in FIG. 4, many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, a topic mapping component 422 may request a list of topics pertaining to message broker 426 (block 410). The message broker 426 may receive the request for the list of topics (block 412). In various examples, the request for the list of topics may specify one or more publishers configured in communication with the message broker 426, may request all topics handled by the message broker and/or may otherwise specify a subset of the various topics handled by message broker 426. In other examples, the topic mapping component 422 may request a list of all topics handled by the particular message broker 426.

In response, message broker 426 may send a list of topic names (block 413). The list of topic names may correspond to the requested list of topics in the request sent by topic mapping component 422. For example, if the topic mapping component 422 requested a subset of all topics (e.g., topics related to one or more specified publishers), the list of topic names may include only those topic names related to the specified publishers. In other examples, the list of topic names may include all topic names of a particular event-driven API and/or all topic names handled by the particular message broker 426. In various examples, the list of topic names may be a list of topic identifier data (e.g., data that uniquely identifies each topic so that the topics may be distinguished from one another).

The topic mapping component 422 may receive the list of topic names (block 414) sent by the message broker 426 in response to the request. For each topic name of the list of topic names, topic mapping component 422 may request per-topic message data from the message broker 426 (block 416). For example, the topic mapping component 422 may subscribe to each topic and may sample messages from each topic.

Message broker 426 may receive the per-topic message requests (and/or the subscriber request) from topic mapping component 422 (block 418). Message broker 426 may send messages of each subscribed topic to the topic mapping component 422. Message broker 426 may send the per-topic messages to topic mapping component 422 (block 420). Topic mapping component 422 may receive the per-topic messages (block 421). Topic mapping component 422 may determine schema data from the message header/payload (block 424). For example, the topic mapping component 422 may include computer-executable instructions configured to parse the message header to determine if an external and/or internal reference to schema data is present. In some further examples, the topic mapping component 422 may include computer-executable instructions configured to parse the payload of the message to determine if the schema data is present within the payload (and/or whether an external reference is present that references a location of all or part of the schema data for the message type and/or topic).

Topic mapping component 422 may store an association between each topic/message ID and the schema data that is associated with that topic/message ID in a data structure (block 427). For example, the topic mapping component 422 may generate a topic/schema mapping (such as topic/schema mapping 226) that associates topic IDs and/or message IDs with their associated schemas. After generating the topic/schema mapping, some time may pass (action 429).

A user device 428 may send a request for schema data for a first topic ID to topic mapping component 422 (block 430). For example, the user device 428 may subscribe to a first topic handled by message broker 426. Accordingly, the user device 428 may receive one or more messages from message broker 426 of the first topic. In various examples, the request for schema data may include topic identifier data (e.g., identifying the topic to which the user device 428 is subscribed) and/or message identifier data (e.g., metadata determined from a message header received by the user device 428).

Topic mapping component 422 may receive the request from the user device 428 (block 432). Topic mapping component 422 may perform a lookup of the topic/schema mapping using the first topic ID as a query (block 434). In some examples, a message type ID may also be used as a query term. For example, topics may be associated with multiple message types. Accordingly, in order to determine the correct schema data for the message type, the message ID may also be provided. The topic mapping component 422 may determine schema data associated with the provided topic ID and/or message ID. The topic mapping component 422 may send the schema data to the requesting device (block 436). The user device 428 may receive the schema data in response to the request (block 438). Thereafter, the user device 428 may be enabled to programmatically parse the message data and/or may use the schema to develop applications and/or APIs that may automatically ingest the message data.

Figure 5:
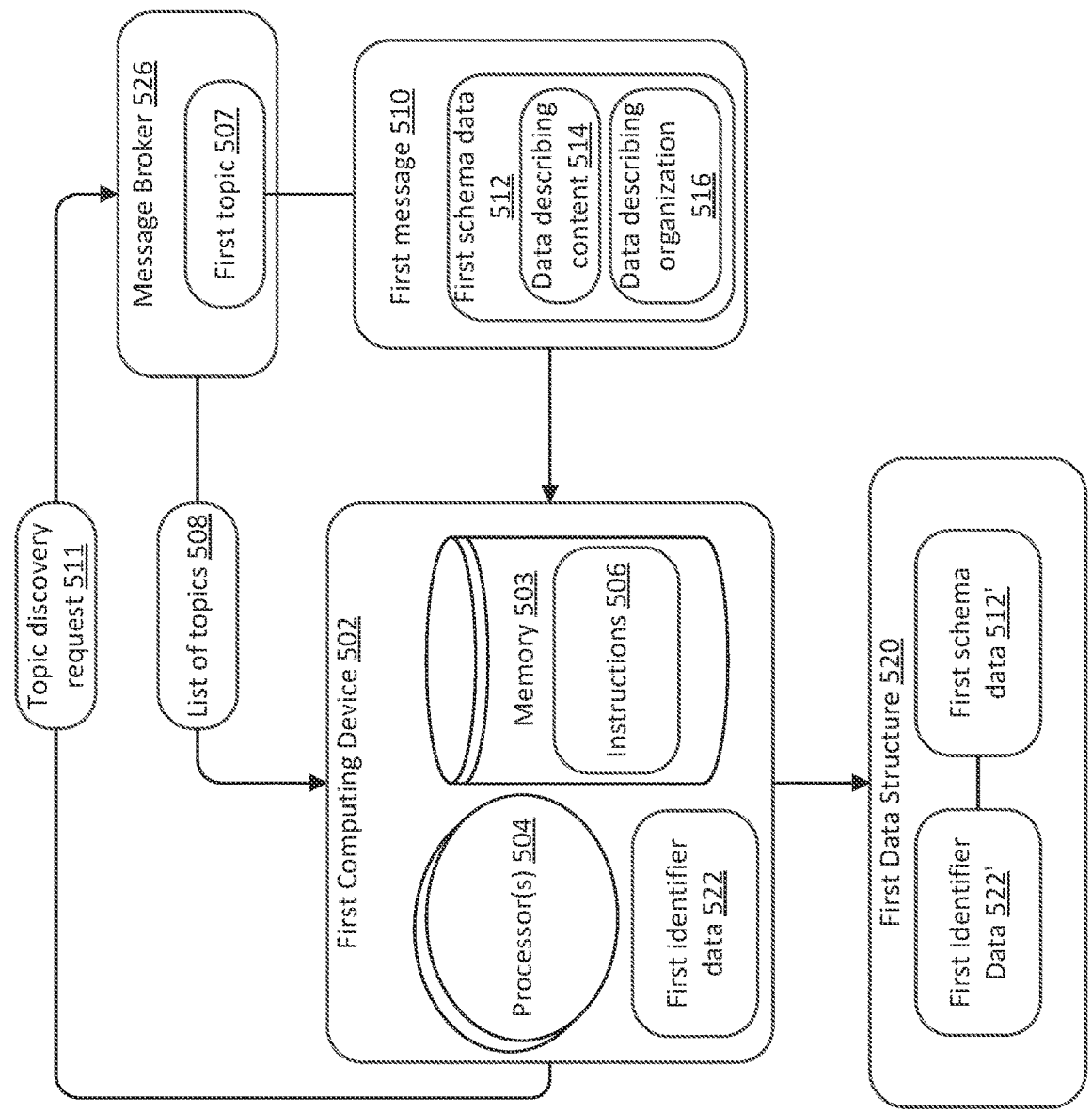
FIG. 5 is block diagram of a computing device in communication with a message broker according to an example of the present disclosure.

FIG. 5 is block diagram of a system 500 comprising a first computing device 502 in communication with a message broker 526 according to an example of the present disclosure. First computing device 502 may comprise at least one processor 504 and non-transitory computer-readable memory 503. The memory 503 may store non-transitory computer-readable instructions 506. The instructions 506 may be executed by the processor to perform various techniques described herein related to topic/schema mappings.

The first computing device 502 may be configured in communication with a message broker 526. The message broker 526 may have one or more registered topics including first topic 507. The first topic 507 may be a topic of an event-driven architecture for which message broker 526 receives message data published by one or more publishers. Message broker 526 may send the message data to one or more subscribers subscribed to the first topic 507. The first computing device 502 may send a topic discovery request 511 to the message broker 526. In response, the message broker 526 may send list of topics 508 to the first computing device 502. In various examples, first computing device 502 may subscribe to first topic 507.

Message broker 526 may send a first message 510 of the first topic 507 to first computing device 502. The first message 510 may include first identifier data 522 that may identify the first topic 507 from among other topics of the message broker 526. In various examples, first computing device 502 may subscribe to the first topic 507 in order to receive the first message 510 of the first topic 507. The first message 510 may comprise or otherwise be associated with first schema data 512. The first schema data 512 may include data describing content 514 of the first message 510 and/or data describing an organization 516 of the first message 510. First computing device 502 may parse the first message 510 to determine the first schema data 512 and/or the first identifier data 522. First computing device 502 may receive the first message 510 and may store the first schema data 512' in a first data structure 520 in association with the first identifier data 522'. The first data structure 520 may be, for example, a database (e.g., a lookup table) and/or some other data structure, depending on the desired implementation.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
sending, by at least one processor, a topic discovery request to a message broker of an asynchronous computer messaging architecture, the topic discovery request requesting a list of topics registered with the message broker, wherein a topic comprises a computer message defined by the message broker;
receiving, by the at least one processor from the message broker, the list of topics registered with the message broker; determining, by the at least one processor, first topic identifier data identifying a first topic of the list of topics;
receiving, by the at least one processor, a first message from the message broker, the first message pertaining to the first topic;
determining, by the at least one processor, first schema data by parsing at least one of first header data or first payload data of the first message, the first schema data describing first content of the first message and organization of the first content of the first message;
generating, by the at least one processor, a first mapping between the first topic identifier data and the first schema data by storing the first topic identifier data in association with the first schema data in a first data structure, wherein the first schema data is effective to enable a computer-implemented application to parse messages of the first topic;
receiving a second message from the message broker, the second message pertaining to the first topic; determining that the second message is associated with a same topic as the first message based on the second message being associated with the first topic identifier data;
determining that the second message comprises second schema data different from the first schema data, the second schema data describing content of the second message and organization of the content of the second message;
generating first message type data distinguishing the first message from the second message;
storing the first message type data in the first data structure in association with the second schema data and the first topic identifier data; receiving a request from a first computing device, the request comprising the first topic identifier data; determining the first schema data by performing a lookup in the first data structure using the first topic identifier data; sending the first schema data to the first computing device, wherein the first computing device develops an application programming interface (API) using the first schema data to programmatically ingest messages of the first topic.

2. The method of claim 1, further comprising:
determining, for each topic of the list of topics, respective topic identifier data;

sampling at least one message from each topic of the list of topics; and programmatically updating the first data structure by storing mappings between each unique instance of topic identifier data from among sampled messages and respective schema data associated with the respective unique instances of topic identifier data.

3. The method of claim 2, wherein message parsing is disabled for messages with topic identifier data that is stored in the first data structure.

4. The method of claim 1, further comprising:

determining topic identifier data for each topic of the list of topics; and for each topic of the list of topics, determining schema data associated with each respective topic.

5. The method of claim 1, further comprising:

receiving a query comprising the first topic identifier data;

performing a lookup using the first topic identifier data; and determining that the first schema data is associated with the first topic identifier data.

6. The method of claim 1, further comprising:

receiving a third message from the message broker, the third message pertaining to the first topic; determining third schema data different from the first schema data using the third message pertaining to the first topic, the third schema data describing content of the third message and organization of the content of the third message; and storing the first topic identifier data in association with the third schema data in the first data structure.

7. The method of claim 1, wherein the asynchronous computer messaging architecture is an event-driven architecture.

8. The method of claim 1, further comprising parsing the first message to identify the first schema data included in the first message.

9. The method of claim 1, further comprising:

parsing the first header data of the first message to identify a reference to an external schema stored at a remote location; and retrieving the first schema data from the remote location using the reference.

10. The method of claim 1, further comprising:

parsing the first header data of the first message;

determining that schema data for the first message is unavailable in the first header data;

parsing the payload data of the first message in response to the schema data for the first message being unavailable in the first header data; and determining the first schema data included in the payload data of the first message.

11. A system comprising:

a message broker of an asynchronous computer messaging architecture; and a first computing device comprising: at least one processor; and non-transitory computer-readable memory storing instructions that, when executed by the at least one processor are configured to:

send a topic discovery request to the message broker the topic discovery request requesting a list of topics registered with the message broker, wherein a topic comprises a computer message defined by the message broker;

receive, from the message broker, the list of topics registered with the message broker; determine first topic identifier data identifying a first topic of the list of topics;

determine first schema data by parsing at least one of header data or payload data of the first message, the first schema data describing first content of the first message and organization of first content of the first message;

store the first topic identifier data in association with the first schema data in a first data structure, wherein the first schema data is effective to enable a computer-implemented application to parse messages of the first topic;

receive a second message from the message broker, the second message pertaining to the first topic;

determine that the second message is associated with a same topic as the first message based on the second message being associated with the first topic identifier data;

determine that the second message comprises second schema data different from the first schema data, the second schema data describing content of the second message and organization of second content of the second message;

generate first message type data distinguishing the first message from the second message;

store the first message type data in the first data structure in association with the second schema data and the first topic identifier data;

receive a request from a first computing device, the request comprising the first topic identifier data;

determine the first schema data by performing a lookup in the first data structure using the first topic identifier data;

send the first schema data to the first computing device, wherein the first computing device develops an application programming interface (API) using the first schema data to programmatically ingest messages of the first topic.

12. The system of claim 11, wherein the non-transitory computer-readable memory stores further instructions that, when executed by the at least one processor, are further configured to:

determine, for each topic of the list of topics, respective topic identifier data; and sample at least one message from each topic of the list of topics.

13. The system of claim 11, wherein the non-transitory computer-readable memory stores further instructions that, when executed by the at least one processor, are further configured to:

determine topic identifier data for each topic of the list of topics; and for each topic of the list of topics, determine schema data associated with each respective topic.

14. The system of claim 11, wherein the non-transitory computer-readable memory stores further instructions that, when executed by the at least one processor, are further configured to:

receive a query comprising the first topic identifier data;

perform a lookup using the first topic identifier data; and determine that the first schema data is associated with the first topic identifier data.

15. The system of claim 11, wherein the non-transitory computer-readable memory stores further instructions that, when executed by the at least one processor, are further configured to:
- receive a third message from the message broker, the third message pertaining to the first topic;
- determine third schema data different from the first schema data using the third message pertaining to the first topic, the third schema data describing content of the third message and organization of content of the third message; and
- store the first topic identifier data in association with the third schema data in the first data structure.

16. The system of claim 11, wherein the non-transitory computer-readable memory stores further instructions that, when executed by the at least one processor, are further configured to:
- parse the header data of the first message to identify a reference to an external schema stored at a remote location; and
- retrieve the first schema data from the remote location using the reference.

17. A non-transitory machine readable medium storing a program, which when executed by a processor is configured to:
- send a topic discovery request to the message broker the topic discovery request requesting a list of topics registered with the message broker, wherein a topic comprises a computer message defined by the message broker;
- receive, from the message broker, the list of topics registered with the message broker; determine first topic identifier data identifying a first topic of the list of topics;
- determine first schema data by parsing at least one of header data or payload data of the first message, the first schema data describing first content of the first message and organization of first content of the first message;
- store the first topic identifier data in association with the first schema data in a first data structure, wherein the first schema data is effective to enable a computer-implemented application to parse messages of the first topic;
- receive a second message from the message broker, the second message pertaining to the first topic;
- determine that the second message is associated with a same topic as the first message based on the second message being associated with the first topic identifier data;
- determine that the second message comprises second schema data different from the first schema data, the second schema data describing content of the second message and organization of second content of the second message;
- generate first message type data distinguishing the first message from the second message;
- store the first message type data in the first data structure in association with the second schema data and the first topic identifier data;
- receive a request from a first computing device, the request comprising the first topic identifier data;
- determine the first schema data by performing a lookup in the first data structure using the first topic identifier data;
- send the first schema data to the first computing device, wherein the first computing device develops an application programming interface (API) using the first schema data to programmatically ingest messages of the first topic.

18. The non-transitory machine readable medium of claim 17, which, when executed by the processor, further causes the processor to:
- determine, for each topic of the list of topics, respective topic identifier data; and
- sample at least one message from each topic of the list of topics.

19. The non-transitory machine readable medium of claim 17, which, when executed by the processor, further causes the processor to:
- determine topic identifier data for each topic of the list of topics; and
- for each topic of the list of topics, determine schema data associated with each respective topic.

* * * * *